G. HUHN.
HOLLOW PACKING RING FOR STUFFING BOXES.
APPLICATION FILED SEPT. 7, 1906.
899,985.
Patented Sept. 29, 1908.
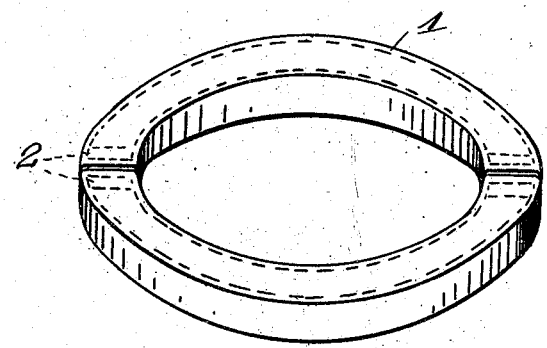
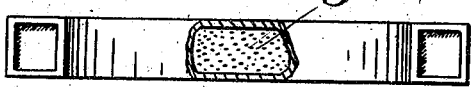
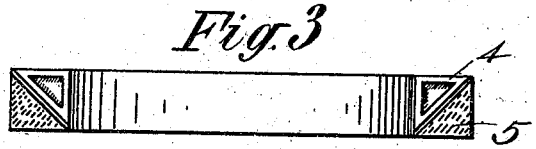
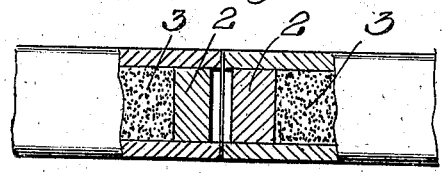
Witnesses
Inventor
Gustav Huhn
by H. B. Willson & Co.
Attorneys

UNITED STATES PATENT OFFICE.

GUSTAV HUHN, OF BERLIN, GERMANY.

HOLLOW PACKING-RING FOR STUFFING-BOXES.

No. 899,985.　　　　Specification of Letters Patent.　　Patented Sept. 29, 1908.

Application filed September 7, 1906. Serial No. 333,671.

*To all whom it may concern:*

Be it known that I, GUSTAV HUHN, manufacturer, citizen of Germany, subject of the King of Prussia and Emperor of Germany, residing at 6 Oldenburgerstrasse, Berlin, in the Kingdom of Prussia and Empire of Germany, have invented a new and useful Improvement in Hollow Packing-Rings for Stuffing-Boxes and the Like, of which the following is a specification.

Hollow packing rings for stuffing boxes and the like, made of flexible or soft metal and filled with movable material as graphite were until now always made round (circular, oval, and the like) in cross section. When in use and by the pressure of the gland these rings would gradually conform to the shape corresponding to the space available and the shape of the pressing surface, whereby the cross section thereof generally became more or less rectangular. Such flexible rings, filled with movable material are cut transversely to form sections to provide for their ready insertion into the joint, and the cut ends are closed by equally soft metal, for instance by plugs, metal plates, soldered joints and the like, to prevent the escape of the filling through said ends. The deformation and change of section, caused by the compression in use will frequently cause leakage at the closed ends, as the connection between the closing piece, as for instance the plug and the metal of the ring cannot withstand the heavy strain of the deformation, and the pressure is transmitted in round rings with round plugs on one point or along a single line only.

The present invention avoids this defect, by forming the rings of such shape in cross section as they would assume while in use in the stuffing box or the like. Therefore, the closures at the ends of the rings are made of corresponding shape. During use there will consequently occur only a slight deformation of the rings and the strain on the closures will be less and by no means torsional. These rings may be completely closed or they may be filled with a lubricant as graphite, which is permitted to gradually escape during use through certain openings provided in the walls of the rings.

The object of the present invention is preferably accomplished by making the upper and lower surfaces of the rings flat.

In the accompanying drawings, Figure 1 is a perspective view of a packing ring constructed in accordance with this invention; Fig. 2 is an end view of one section thereof with parts broken out to show the filling contained therein; Fig. 3 is an end view of a modified form thereof. Fig. 4 is a detail sectional view.

In the accompanying drawing the invention is exemplified in one design in Figs. 1 and 2, the ring 1 there shown being rectangular or square in cross section and cut transversely with the cut ends closed by soft metal plug-like closures as 2.

In Fig. 2 a part of the shell has been removed, to show the filling 3. The rings may also consist of several sectional rings placed on each other and supplementing each other to obtain the required section. The total section produced by such combination then has the same shape as produced in rings of round section when in use in stuffing boxes and the like. Hence the ring made of soft material and having plane upper and bottom surfaces may consist of any number of rings placed one on the other, the contact surfaces of which may have any suitable shape. Fig. 3 is a type of such a ring, consisting of two rings 4 and 5 triangular in cross section. It is not necessary that all rings should be hollow and filled with movable material, some of them may be made as solid rings of soft or flexible metal. In Fig. 3 for instance, the upper ring 4 is hollow and the bottom ring 5 solid. The single rings supplement each other to a square section.

I claim as my invention:—

1. A packing ring for stuffing boxes and the like comprising a hollow split ring composed of soft metal and having the ends thereof flattened on their upper and lower faces and provided with soft metal plug like closures.

2. A packing ring for stuffing boxes comprising a hollow soft metal split ring having the ends thereof flattened at their upper and lower surfaces and provided with soft metal closures conforming in shape to the end openings.

3. A packing ring for stuffing boxes comprising a hollow split ring composed of soft metal and filled with a compressible substance and having the ends thereof flattened on their upper and lower faces and provided with soft metal plug like closures.

4. In a packing ring for stuffing boxes, the combination of a hollow split ring composed of soft metal and filled with a movable substance, the upper and bottom surfaces of the ring being flattened and plug like soft metal stoppers arranged in the ends of said flattened hollow metal ring.

5. In a packing ring for stuffing boxes, the combination of a hollow sectional ring filled with a movable substance and having the upper and lower surfaces thereof flattened, said flattened hollow sections being composed of soft metal, metal stoppers arranged in the ends of said sections, some of the sections composing the ring being made solid and the others hollow and filled with a movable material and closed at the ends by metal stoppers.

6. A hollow packing ring for stuffing boxes composed of soft metal and filled with a movable substance, said ring being split and closed at the ends by metal closures, said ring having the upper and lower surfaces flattened at said ends.

In testimony whereof I have hereunto set my hand in presence of two subscribing witnesses.

GUSTAV HUHN.

Witnesses:
WOLDEMAR HAUPT,
HENRY HASPER.